United States Patent
Brown et al.

(10) Patent No.: US 8,377,171 B2
(45) Date of Patent: Feb. 19, 2013

(54) METHODS AND SYSTEMS FOR PURIFYING GASES

(75) Inventors: Lloyd Anthony Brown, E. Amherst, NY (US); Thomas Justin Thompson, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 366 days.

(21) Appl. No.: 12/776,862

(22) Filed: May 10, 2010

(65) Prior Publication Data

US 2010/0218677 A1 Sep. 2, 2010

Related U.S. Application Data

(62) Division of application No. 11/729,457, filed on Mar. 29, 2007, now Pat. No. 7,740,690.

(51) Int. Cl.
B01D 53/04 (2006.01)

(52) U.S. Cl. .............................. 95/115; 95/148

(58) Field of Classification Search .............. 95/114, 95/115, 117, 120, 123, 126, 137, 139, 148; 96/139–141, 143, 146, 152
See application file for complete search history.

(56) References Cited

U.S. PATENT DOCUMENTS

| | | | |
|---|---|---|---|
| 2,989,383 A | 6/1961 | Miller | |
| 3,298,527 A | 1/1967 | Wright | |
| 3,734,293 A * | 5/1973 | Biskis | 210/185 |
| 4,026,680 A * | 5/1977 | Collins | 95/99 |
| 4,165,972 A | 8/1979 | Iles et al. | |
| 4,444,727 A | 4/1984 | Yanagihara et al. | |
| 4,582,516 A | 4/1986 | Kadi | |
| 5,169,413 A | 12/1992 | Leavitt | |
| 5,213,593 A * | 5/1993 | White, Jr. | 95/99 |
| 5,268,022 A | 12/1993 | Garrett et al. | |
| 5,298,054 A | 3/1994 | Malik | |
| 5,441,716 A | 8/1995 | Rockenfeller | |
| 5,837,027 A | 11/1998 | Olander et al. | |
| 5,861,050 A | 1/1999 | Pittel et al. | |
| 5,917,140 A | 6/1999 | Tom | |
| 6,461,411 B1 * | 10/2002 | Watanabe et al. | 95/116 |
| 6,500,238 B1 | 12/2002 | Brandes et al. | |
| 6,576,138 B2 | 6/2003 | Sateria et al. | |
| 6,749,819 B2 | 6/2004 | Otsuka et al. | |
| 2002/0100369 A1 | 8/2002 | Kuriiwa et al. | |

OTHER PUBLICATIONS

Bonjour, Jocelyn et al. Temperature Swing Adsorption Process with Indirect Cooling and Heating. Ind. Eng. Chem. Res. 41 (2002) pp. 5802-5811.

Menard, D. et al. Activated Carbon Monolith of High Thermal Conductivity for Adsorption Processes Improvement Part A : Adsorption Step. Chemical Eng. and Proc. 44 (2005) pp. 1029-1038.

Weiner, Arnold L. Drying Gases and Liquids. Dynamic Fluid Drying. Chemical Engineering (Sep. 16, 1974) pp. 92-101.

\* cited by examiner

*Primary Examiner* — Frank Lawrence, Jr.
(74) *Attorney, Agent, or Firm* — Nilay S. Dalal

(57) ABSTRACT

The present invention relates to methods and systems for purifying gases, such as for example semiconductor process gases. The invention more particularly relates to fluid purification methods and systems having improved heat transfer capabilities and controls such that the purified fluid produced from the process contains reduced impurity levels and/or exhibits more uniform concentrations within the final product. In another aspect of the invention, the activation time for adsorbent beds used in such processes and systems can be reduced.

4 Claims, 5 Drawing Sheets

METHODS AND SYSTEMS FOR PURIFYING GASES

The present application is a division of U.S. patent application Ser. No. 11/729,457, filed Mar. 29, 2007 and now U.S. Pat. No. 7,740,690, and entitled "METHODS AND SYSTEMS FOR PURIFYING GASES", which is incorporated by reference herein in its entirety.

FIELD OF THE INVENTION

The present invention relates generally to methods and systems for purifying gases, such as for example semiconductor process gases. The invention more particularly relates to gas purification methods and systems having improved heat transfer capabilities and controls such that the purified gas produced from the process contains reduced impurity levels and/or exhibits less variability in impurity concentration.

BACKGROUND OF THE INVENTION

Process gases such as those gases used for semiconductor processes (e.g., arsine ($AsH_3$), phosphine ($PH_3$) and ammonia ($NH_3$)) typically must be purified prior to use in semiconductor processes in order to remove impurities (e.g., moisture, $CO_2$ and $SO_2$) to acceptable levels. For example, ammonia is used as a source gas in the chemical vapor deposition (CVD) of nitride films during the fabrication of semiconductor chips. Typical nitrides are silicon nitride, made for example by the reaction of silane and ammonia and titanium nitride, made for example by the reaction of titanium tetrachloride and ammonia. The presence of one to three thousand parts per billion (ppb) levels of moisture can result in a decrease of the performance properties of the nitride layer. Gallium nitride CVD technology has been shown to require even lower levels of moisture in the source of ammonia than silicon and titanium nitride technology.

Purification of such gases either prior to use in semiconductor applications or in purification after use and before re-use currently includes passing the process gas through one or more beds formed of an adsorbent to remove such target impurities.

U.S. Pat. No. 6,576,138 B2 to Sateria et al. discloses a method for producing purified semiconductor gases from its impure form using adsorption and evaporation techniques.

U.S. Pat. No. 6,749,819 B2 relates to a process for purifying ammonia. The process relates to contacting crude ammonia with catalyst to remove oxygen and/or carbon dioxide that are present in the ammonia as impurities. The reference also relates to contacting crude ammonia with a catalyst that contains manganese oxide as an ingredient and then contacting the ammonia with a synthetic zeolite to remove at least one of carbon dioxide, oxygen and moisture from the ammonia.

Adsorption processes can be sensitive to temperature. Generally, higher operating and/or ambient temperatures will reduce adsorption efficiency. In addition, gas purification systems are often located in geographical areas where the ambient temperature is not controlled or monitored, and/or can fluctuate significantly based on prevailing weather and other environmental conditions. Consequently, there can be significant variability in the temperature of the adsorbent bed. The adsorption process itself moreover results in an increase in the temperature of the adsorbent bed, especially in cases where the moisture content of the feed material is high. These factors can cause the quality of the material being purified to fluctuate on the basis of the operating temperature of the adsorbent bed and/or surrounding conditions.

Another factor to be considered with regard to the purification of such gases includes the time required for activation of the adsorbent bed(s). The activation process involves heating the adsorbent bed(s) to elevated temperatures (for example, 100° C. to 400° C.) while flowing a dry purge gas through the bed(s). Because many adsorbents used in purification systems for semiconductor gases are of low thermal conductivity, it can be difficult to control the temperature of the adsorbent bed not only during purification operations, but also during the activation phase of the adsorbent bed.

Previous attempts to address heat transfer issues have involved several approaches. For example, the use of monoliths of carbon with higher thermal conductivity than granular adsorbents as the adsorbent media in the bed to improve heat transfer is proposed in Menard, et al., "Activated Carbon Monolith of High Thermal Conductivity for Adsorption Processes Improvement Part A: Adsorption Step", Chemical Engineering and Processes, 44 (2005), 1029-1038.

A method for heat transfer in the bed in which a finned inner-tube is enclosed in a larger tube and the adsorbent material is contained in the annulus thus formed between the two tubes is contemplated in Bonjour, et al., "Temperature Swing Adsorption Process with Indirect Cooling and Heating", Ind. Eng. Chem. Res. 2002, 41, pages 5802-5811.

Some general means of removing moisture from fluids is discussed in Weiner, "Dynamic Fluid Drying", Chemical Engineering, Sep. 16, 1974, pages, 92-101.

U.S. Pat. No. 4,165,972 to Iles et al. proposes heating and cooling of the sorbent beds by flowing coolant through the beds.

U.S. Pat. No. 5,169,413 to Leavitt relates to a pressure swing adsorption (PSA) system which includes means for controlled retention of internally generated, self-refrigeration such that the average temperature of the bed is to be reduced.

U.S. Pat. No. 5,268,022 to Garret et al. proposes a method for heat transfer within a bed that involves having at least one heat conductive member containing a liquid medium arranged within the bed such that in operation, heat is said to be conducted by convection through the liquid from a region of maximum temperature at or near the bottom of the bed to a region of minimum temperature at or near the top of the bed.

There remains a need in the art of gas purification for improved temperature control of adsorbent beds such that the purified gas produced from such processes contain reduced impurity levels and/or exhibit less variability in impurity concentration. There also remains a need to reduce the time required to activate adsorbent beds prior to use and/or reuse in such purification processes.

SUMMARY OF THE INVENTION

The present invention relates to methods and systems for purifying gases, such as for example semiconductor process gases. More specifically, the invention provides gas purification systems having improved heat transfer capabilities and temperature controls such that impurity concentration levels in the purified gas can be reduced and/or such that the purified product can have an improved consistency in terms of its product quality.

In another aspect of the invention, the activation time (i.e., which can include the time required for the bed to heat up to the desired activation temperature, the time for the activation step (including activation of a new bed of adsorbent or regeneration of a used bed of adsorbent) and the time to cool down to operating or ambient temperature) for adsorbent beds used in such processes and systems can be reduced.

In accordance with one embodiment of the present invention, semiconductor process fluids (e.g., arsine ($AsH_3$), phosphine ($PH_3$) and ammonia ($NH_3$)) can be purified for use by providing at least one adsorbent vessel having at least one adsorbent bed formed of at least one adsorbent therein with heat transfer enhancing internals and maintaining the temperature of the at least one adsorbent bed within a predetermined temperature range while passing the fluid to be purified over the at least one adsorbent bed. The adsorbent bed(s) can include one or more layers of adsorbent(s) (and optionally, one or more layers of thermally conductive layers) and configured such that process fluid flows through the bed(s). The bed(s) can be segmented into sections depending on the configuration of the heat transfer internals (e.g., the number and positions of the plate(s)). As a result and as discussed herein, it is expected that the final purified gas product will exhibit improved consistency in impurity levels and/or improved purity based on the higher adsorption capacity of adsorbents operating at lower temperature and narrower temperature ranges.

The present invention more particularly provides purification systems and methods in which solid plates (which alternatively can be perforated) are in thermal contact with and/or secured to the internal wall of at least one adsorbent vessel such that adequate heat transfer can be accomplished through the wall of the adsorbent vessel from a heating/cooling source external to the adsorbent vessel. The arrangements provided by the present invention can allow for both heating and/or cooling of the adsorbent vessel and the at least one adsorbent bed formed of the at least one adsorbent, with such heating/cooling being capable of providing more consistent and uniform temperature distribution and control throughout the adsorbent bed(s). In addition, the configurations of the present invention can allow for both direct and/or indirect transfer of heat and/or cooling to the adsorbent bed by contacting the adsorbent vessel with one or more heat transfer arrangements. For example, direct heating can be provided by immersing the vessel in a heat transfer fluid. Heat transfer can also be provided by indirect heating, for example by circulating fluid in a heat exchanger in thermal contact with the vessel or by an electrical heating jacket(s).

Due to more efficient heat transfer within the bed(s), the arrangements provided by the present invention allow for flexibility in the selection of adsorbents to be used during the purification process. Moreover, the configurations provided in accordance with the present invention do not require heat transfer fluid to flow within the bed, thus reducing or eliminating the potential for contamination of the material being purified.

In an embodiment of the present invention, a vessel containing at least one bed formed of at least one adsorbent therein is provided. At least one plate in thermal contact with the inner wall of the vessel and formed of material having higher thermal conductivity (e.g., materials of high thermal conductivity such as aluminum or steel or ceramic) than the thermal conductivity of the adsorbent(s) and being inert to the at least one adsorbent and the process media is used to improve heat transfer to and from the vessel and the bed. The at least one plate may be solid or perforated and in the case of ceramics, may be porous. The plates and vessel further improve temperature control within the vessel and bed so that temperature throughout the bed can be maintained within a predetermined temperature range.

The number of plates used in accordance with the present invention can vary, depending on the process and/or system being used, the fluid to be purified and the characteristics of the adsorbent(s). For example, the number of plates can be selected based on a balance between minimizing the reduction in surface area contact between the fluid being purified and the adsorbent(s) and the desired heat transfer parameters of the process being utilized. In some embodiments, the number of plates can also be selected based on limiting the impact of the weight of the plate(s) on the system. In addition, the plate or plates can be configured to extend over the entire length and diameter of the bed, while in other embodiments, the plate or plates can extend over a portion of the length and/or diameter of the bed. Determination of the number of plates and their configuration can be made based on desired heat exchange performance and the desired throughput of the material to be purified. The plates are to be designed to minimize the reduction in the contact area between the adsorbent(s) and the process fluid balanced with desired heat transfer characteristics.

In some embodiments of the present invention, thin layers (e.g., layers of beads or perforated wheel(s) of material(s) of high thermal conductivity (e.g., higher thermal conductivity relative to the thermal conductivity of the adsorbent(s))) could be inserted among layers of adsorption material(s) in the at least one adsorption bed. The thermally conductive material is to be formed of a material that is chemically inert with regard to both the process fluid and impurities as well as to the adsorbent(s). For example and while not to be construed as limiting, thin layers of aluminum, steel, ceramic materials and/or combinations thereof could be inserted among layers of adsorption material. In these embodiments, the configurations are selected to minimize surface area reduction and to maximize contact between the process media (i.e. a process fluid such as the fluid being purified and/or an activation fluid such as a purge material) and the adsorbent material to obtain consistent temperature control within the adsorption bed(s).

In yet other aspects of the present invention (and in addition to improving the time required for activation), it is expected that the time to heat and/or cool the adsorption vessel and bed(s) to and from operating conditions prior to and following the purification process can be reduced. More specifically, the adsorption bed(s) can be heated or cooled to a predetermined pre-operating temperature (for example 20° C.) prior to initiating the purification step. During purification, the temperature of the bed(s) is within a desired operating temperature range (for example, within +/−10° C. of about 20° C.) within an acceptable purification temperature range (e.g., −150° C. to 150° C.) based on the adsorption behavior of the material to be purified and the adsorbent type being used. For example and while not to be construed as limiting, it may be desirable to heat or cool the temperature within the vessel to about 20° C. prior to purification in order to heat or cool the vessel to operating temperature. The heat transfer arrangements of the present invention can be used to more quickly achieve the desired operating purification temperature. As discussed herein, it may also be desirable to heat the vessel and the at least one bed at the end of the purification step to a predetermined temperature to remove adsorbed fluid prior to disposal of the adsorbent.

During purification and depending on the process being used, the fluid being purified and the adsorbent(s) being used, it is usually desirable to maintain the temperature within the bed as uniform as possible within an acceptable purification temperature range (e.g., −150° C. to 150° C.). For example, it may be desirable to maintain the temperature within the bed to within +/−10° C. of the operating temperature (e.g., about 20° C.), more preferably within +/−5° C. within the desired operating temperature and even more preferably, within +/−3° C. within a desired operating temperature. In the past, the temperature within the bed(s) has often risen during purification due to inadequate heat transfer control, thereby resulting in less adsorption efficiency and/or inconsistency in product quality. The present invention is expected to overcome such shortcomings by providing for improved heat transfer arrangements and controls such that the temperature within the bed(s) during purification is more uniform.

The present invention thus provides methods for purifying gases which include heating or cooling the adsorption vessel, the at least one adsorption bed(s) formed of the at least one adsorbent therein to a predetermined temperature prior to initiating the purification step such that the temperature throughout the bed is within a predetermined operating temperature range (for example, within +/−10° C. of a desired operating temperature) based on the adsorption behavior of the fluid being processed and the adsorbent(s) being used. Feed temperature of material entering the vessel can be controlled using a heat exchanger or the like on the feed line. Feed fluid (e.g., gas) to be purified is then passed through or over the at least one adsorption bed formed of the at least one adsorbent under predetermined conditions during the purification step. During the purification step, cooling (or if necessary, heat) can be provided to the at least one adsorption bed formed of the at least one adsorbent to maintain and/or reduce the temperature within the vessel to a predetermined purification temperature range based on the adsorption behavior of the impurity being removed. The operating purification temperature will typically be a fixed temperature range (e.g., within +/−10° C. of about 20° C.) within a desired acceptable purification temperature range (e.g., from about −150° C. to about 150° C.). During the purification step, the temperature within the vessel, the bed(s) and the temperature of the gas being processed can be monitored and heat transfer (heat and/or cooling) to and from the vessel based on such temperatures can be regulated to maintain the bed(s) within the desired temperature range.

In an embodiment of the invention, transport of heat to and from the exterior surface of the purifier vessel is expected to involve contacting the adsorbent vessel with a heat exchanger in the form of one or more heating/cooling jacket(s) supplied with a suitable heat transfer fluid to allow the temperature of the fluid being purified in the vessel to be maintained within the operating purification temperature range. Another alternative embodiment to transport heat to and from the exterior surface of the purifier vessel is expected to involve immersing or partially immersing the vessel in a temperature controlled bath. In yet other alternative embodiments of the invention, heat transfer to and from the vessel is expected to be supplied by one or more electrical heat jacket(s) (which can include cooling capabilities such as flow-through passages for coolant), an oven or other suitable heat exchange method. For example and while not to be construed as limiting, one arrangement for heat transfer to and from the adsorbent beds includes conduits located within a shell or jacket(s) made of material(s) of high thermal conductivity (such as aluminum) which can be secured to the exterior surface of the vessel by clamping or other means. Heat transfer fluid having appropriate heat transfer capabilities based on the purification process flows through the shell/jacket(s). As explained herein, in some such embodiments, a plurality of jackets can be utilized to provide more temperature control within the vessel.

Heat transport and control in accordance with the invention is expected to improve the dynamic adsorption efficiency of adsorption beds, thus producing purified process fluids having higher purity and/or improved consistency in terms of its concentration of impurities and/or producing a higher purity product from the same number of beds.

In addition, the heat transfer controls of the present invention are expected to allow for operation within a more narrow temperature range than in the past. Such operation is less conservative in the sense that in the absence of such temperature control, the vessel can exhibit more temperature fluctuation and to maintain product quality, the process targets often need to be set for the worst case scenario (e.g., the high end of the temperature range). With temperature control in accordance with the present invention, it is expected that a more precise (e.g., "aggressive") target can be set based on narrower temperature range. Consequently, the configurations of the present invention may allow fewer adsorption vessels and/or smaller vessels to be used. Moreover, by operating the bed at a lower temperature and/or within a narrower temperature range, it is expected that the useful life of the beds can be extended beyond current levels. While the relative cost of implementing the temperature control system may not be lower than for installing multiple vessels in series, it is expected that by allowing for less conservative operation, fewer vessels will need to be changed-out than currently practiced. This can be significant because of the often highly toxic nature of some materials to be purified and the need to minimize handling and disposal of such materials.

BRIEF DESCRIPTION OF THE DRAWINGS

For a more complete understanding of the present invention and the advantages thereof, reference is made to the following Detailed Description taken in conjunction with the accompanying drawings in which.

DETAILED DESCRIPTION OF THE INVENTION

As mentioned hereinabove, the present invention relates to methods and systems for purifying gases, such as for example semiconductor process gases. More specifically, the invention provides gas purification systems having improved heat transfer capabilities and temperature controls such that the impurity concentration levels in the purified gas can be reduced and/or such that the purified product can have an improved consistency in terms of its product quality.

In another aspect of the invention, the activation time (i.e., which can include the time required for the bed to heat up to the desired activation temperature, the time for the activation step (including activation of a new bed of adsorbent or regeneration of a used bed of adsorbent) and the time to cool down to operating or ambient temperature) for adsorbent beds used in such processes and systems can be reduced.

In accordance with one embodiment of the present invention, semiconductor process gases (e.g., arsine ($AsH_3$), phosphine ($PH_3$) and ammonia ($NH_3$)) can be purified by providing at least one adsorbent vessel containing at least one adsorbent bed formed of at least one adsorbent(s). The vessel further contains heat transfer internals and controls for maintaining the temperature within the vessel at an operating temperature range (e.g., within +/−10° C. within about 20° C.) within an acceptable purification temperature range (e.g., −150° C. to 150° C.). As a result, it is expected that the final purified gas product will contain reduced impurity levels relative to the prior art and/or will exhibit improved product consistency due to improved temperature control within the bed(s).

In addition, the present invention is expected to provide economic advantages in that it can be easily integrated into existing gas purification systems. This ease of integration is based on an ability to accommodate heat transfer using a variety of different methods, involving either direct or indirect heat transfer capabilities. Another advantage of the present invention is the flexibility to select the adsorbent material(s) that best suits the specific purification process. The present invention can further avoid potential contamination risks by avoiding heat transfer fluid flow within the adsorbent bed(s).

Figure 1:
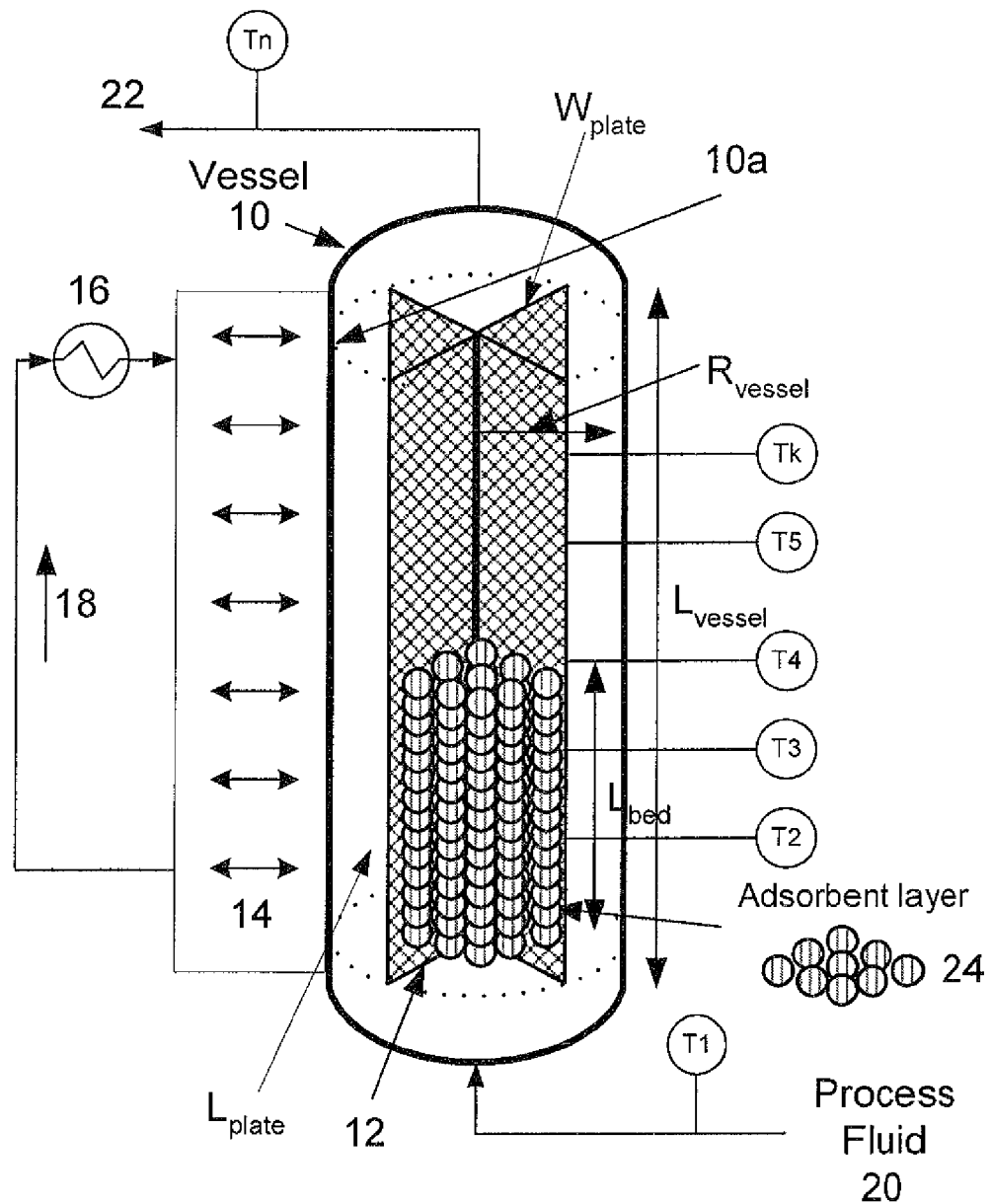
FIG. 1 shows a jacketed vessel in accordance with an embodiment of the present invention.

Referring now to FIG. 1, an embodiment of the present invention is illustrated. In this embodiment, vessel 10 includes at least one adsorption bed formed of at least one adsorbent 24 therein. The adsorbent bed(s) can include one or more layers of adsorbent(s) (and optionally, one or more layers of thermally conductive layers) and configured such that process fluid 20 flows through the bed(s). The bed can be segmented into sections depending on the configuration of the heat transfer internals (e.g., the number and positions of the plate(s)).

Vessel 10 can be constructed from any material having sufficiently high thermal conductivity to transfer heat/cooling to and from the external heat source and the adsorbent bed(s), plate(s) and thermally conductive layer(s) (if present). For example and while not to be construed as limiting, metals such as steel, (e.g., stainless steel, carbon steel or the like), aluminum, nickel, copper or ceramics and combinations thereof may be suitable material(s) for construction of vessel 10 in accordance with the present invention. It will be appreciated by those skilled in the art that the thermal conductivity of the vessel should be greater than the thermal conductivity of the adsorbent(s). It will also be appreciated that the material(s) of construction of vessel 10 should be inert with respect to the process media (i.e. a process fluid such as the fluid being purified and/or an activation fluid such as a purge material).

Vessel 10 has a radius $R_{vessel}$ and the bed has a radius $R_{bed}$ in which $R_{vessel}$ is equal to $R_{bed}$. Vessel 10 also has a length $L_{vessel}$ while the bed has a length $L_{bed}$. In preferred embodiments, $L_{bed}$ is equal to $L_{vessel}$.

The at least one adsorbent bed formed of the at least one adsorbent can be positioned in vessel 10 in a variety of configurations. For example and while not to be construed as limiting, at least one adsorbent can be positioned in one or more layers (including layers of physical mixtures and/or composites) in vessel 10 and can be formed of more than one adsorbent material. As discussed hereinabove, the arrangements of the present invention allow flexibility in selecting the desired adsorbent(s) for the gas being purified.

At least one plate 12 having a width $W_{plate}$ and a length $L_{plate}$ is in thermal contact with the inner wall 10a of vessel 10. The at least one plate(s) 12 can be solid or perforated. In some embodiments, the number of plates will be greater than two. In such embodiments, all of the plates may be solid, all of the plates may be perforated or some of the plates may be solid and some may be perforated. The plate(s) 12 are to be formed of material having higher thermal conductivity than the thermal conductivity of the adsorbent(s) to improve heat transfer to and from vessel 10. The material(s) of construction of plate(s) 12 should also be inert with respect to the process media (i.e. a process fluid such as the fluid being purified and/or an activation fluid such as a purge material) and the adsorbent(s).

The number of plates will be at least one and are to be designed to minimize the reduction in the contact area between the at least one adsorbent and the process media. More specifically, the number of plates can be selected based on a balance between minimizing the reduction in surface area contact between the process media and the adsorbent(s) and desired heat transfer parameters of the process being utilized. In some embodiments, the lengths of the plates may not all be equal. As further shown in FIG. 1, the plates can extend the entire length of the vessel $L_{vessel}$ and have a radius of the bed $R_{bed}$ such that $W_{plate}=R_{bed}=R_{vessel}$. The number of plates shown in FIG. 1 is four and is intended to be for purposes of illustration and is not to be construed as limiting. Alternatively, $W_{plate}$ can be less than the internal radius of the vessel $R_{vessel}$ (shown in FIG. 2a) or can have $W_{plate}$ greater than $R_{vessel}$, but less than or equal to the internal diameter of the vessel (see for example FIG. 2b).

Preferred materials of construction of the plate(s) include materials such as metals, ceramics, thermally conductive plastics and combinations thereof. Exemplary metals include, but are not limited to, aluminum, steel, nickel, copper, tantalum, gold, and metal alloys. The selected material(s) do not readily react with the process media (i.e. a process fluid such as the fluid being purified and/or an activation fluid such as a purge material) or adsorbent(s). Other materials could be used for the plate construction as long as the material(s) is inert with regard to the process media and adsorbent material(s) and has sufficiently high thermal conductivity as described hereinabove. The material(s) of construction for the at least one plate(s) 12 could be the same or different from the material(s) of construction for the vessel. Depending on the process, the at least one plate(s) 12 may thus be of higher thermal conductivity than the vessel or vice versa. Alternate materials of construction of the plates for example could include any metals or ceramics or combinations thereof that offer sufficient thermal conductivity for the given application and do not readily react with the process media (i.e. fluid being purified and/or purge material) or adsorbent(s). In some embodiments, the plates will be perforated to allow for increased contact between the adsorbent(s) and the process media. In cases where the plates are constructed of ceramics or other non-metal materials (e.g., thermally conductive plastic), the plates may also be porous.

The thickness of the plate(s) is to be selected such that heating and/or cooling can be transferred to the adsorbent bed(s) to maintain the bed(s) within a predetermined temperature range during both activation of the bed as well as during the gas purification process (including heating and/or cooling prior to and after purification). In some embodiments where weight of the equipment is an issue, the thickness of the plate(s) and the material of construction can also be selected to limit the overall impact on the weight of the vessel. The plates and heat transfer source improve temperature control within the vessel so that temperature uniformity throughout the bed(s) is improved.

As mentioned above, the at least one plate(s) 12 is in thermal contact with inner wall 10a of vessel 10 such that heat transfer can occur to and from inner wall 10a and plate(s) 12. In some embodiments, plate(s) 12 can also be secured to inner wall 10a by any of several methods. For example and while not to be construed as limiting, plate(s) 12 can be secured to wall 10a by: welding, soldering, nuts and bolts, adhesive, inserting plate(s) 12 into grooves formed in inner wall 10a and the like. In some embodiments, a plurality of solid and/or perforated plates could be arranged together with a central axis to form a thermally conductive integrated unit. The thermally conductive unit could then be inserted into the vessel 10. Such embodiments may be suitable for retrofit applications. Adsorbent(s) could then be loaded in the vessel 10 for the desired process.

In some illustrative embodiments of the invention, a plurality of perforated plates 12 in thermal contact (e.g. by welding or the like) with the inner wall 10a of the adsorption vessel 10 can be used. The plates can extend over the entire length of the vessel or bed such that heat transfer occurs along the length of the vessel or bed respectively. The plates can also extend beyond the length of the bed when the length of the bed is less than the length of the vessel. In such embodiments, the lengths of the plates are confined by the length of the vessel. In other embodiments of the invention, the length of the bed, length of the vessel and length(s) of some or all of the plates are all equal. The width of the plates can be equivalent to the internal radius of the vessel ($W_{plate}=R_{vessel}$). In this manner, heat transfer can extend over the entire length and width of the bed.

As further mentioned above, the number of plates is at least one and can vary in number. The plate or plates can be configured to extend over the entire length and diameter of the bed, while in other embodiments, the plate or plates extend over a portion of the length and/or diameter of the bed. In some cases and particularly where there may be a safety factor between theoretical loading capacity and actual loading allowed in the field, it may be preferred not to have the plate(s) extend the length of the bed or vessel because adsorption may not occur in some regions of the bed or vessel. As mentioned above, the plates are to be designed to minimize the reduction in the contact area between the adsorbent bed and the process media considered with the desired heat transfer characteristics.

The at least one adsorbent in the bed could be any adsorbent or combination of adsorbents selected for the particular application (i.e. the fluid to be purified). The adsorbent or adsorbents could likewise be provided in one or more layers and further include layers of inert materials (e.g., pellets, balls or the like) above and/or below the adsorbent layer(s). For example and while not to be construed as limiting, the adsorbent or adsorbents could include activated carbon, alumina, silica and zeolite molecular sieves such as for example 3A, 4A, 5A, 13X and combinations thereof. The present invention, however, is not limited to the use of such adsorbent(s). Depending on the application, other adsorbents may be suitable for use in accordance with the present invention.

As further illustrated in FIG. 1, transport of heat to and from the exterior surface of the adsorbent vessel 10 can include contacting, for example by surrounding the adsorbent vessel, with a heat exchanger in the form of a heating/cooling jacket supplied with a suitable circulating heat transfer fluid 18 to allow the temperature of the fluid being purified to be maintained within a purification temperature range, for example between about −150° C. and 150° C. For example, it is usually desirable to maintain an adsorption temperature distribution profile within a vessel and adsorption bed as uniform as possible during a purification process. For purposes of illustration, if a purification is being performed at ambient temperature (e.g., 20° C.), it is usually preferred to maintain the temperature throughout the vessel 10 and the at least one adsorption bed within +/−10° C. of about 20° C., more preferably within +/−5° C. of about 20° C. and still more preferably within +/−3° C. of about 20° C. The precision of the range within the acceptable operating temperature range (e.g., −150° C. to 150° C.) can be selected based on the cost of the heat transfer system, the cost to run the heat transfer system, the desired product purity, the desired product consistency and the like. In accordance with the present invention, heat transfer (heating and/or cooling) to the vessel (and hence to the at least one bed formed of the at least one adsorbent) could therefore occur through use of a heating jacket or through use of a heating fluid either flowing through a jacket or directly in contact with the surface of vessel 10. In some embodiments, the heat transfer system may surround the vessel, while in other embodiments it may not be desirable or preferred for the heat transfer system to surround the vessel. In either case, the heat transfer system is positioned to be in thermal contact with the vessel and provide the appropriate heating and/or cooling to the vessel.

More specifically, heat transfer to and from adsorbent vessel 10 shown in FIG. 1 by arrows 14 can be accomplished using a heat exchanger 16 and circulating fluid 18. Thermocouples $T_1$ to $T_n$ located in the bed and in the process media piping could be used to monitor and regulate the temperature of the bed(s) within vessel 10 as well as the incoming temperature T1 of the process fluid 20 (i.e. the fluid to be purified) and the temperature Tn of product gas 22. The number and location of thermocouples used in the bed and within the process piping is optional and can be selected based on the particular process being utilized and the fluid being processed. Additionally, the feed temperature of the gas to be purified can be controlled using methods known to those skilled in the art, such as through the use of a heat exchanger on the feed line 20. As discussed herein, other external heat transfer arrangements can be used in accordance with the present invention.

In other alternative embodiments of the present invention, the $L_{plates}$ can be greater than the $L_{bed}$ and configured such that the plate(s) can provide heat to the process fluid 20 entering vessel 10. The adsorbent(s) 24 is positioned downstream of such heat source in a manner that the adsorbent bed(s) is positioned proximate to the product end of vessel 10 for product gas 22.

Vessels in accordance with the present invention can be manufactured and the appropriate internals (including plate (s), thermocouples and the like) can be positioned in the vessel. Adsorbent(s) can then be loaded into the vessel. The bed(s) in the loaded vessel can be activated using one of the heat transfer arrangements. Thereafter, the vessel can be moved to another location or remain in the same location and the same or a different heat transfer arrangement can be used for the purification process.

Figure 2A:
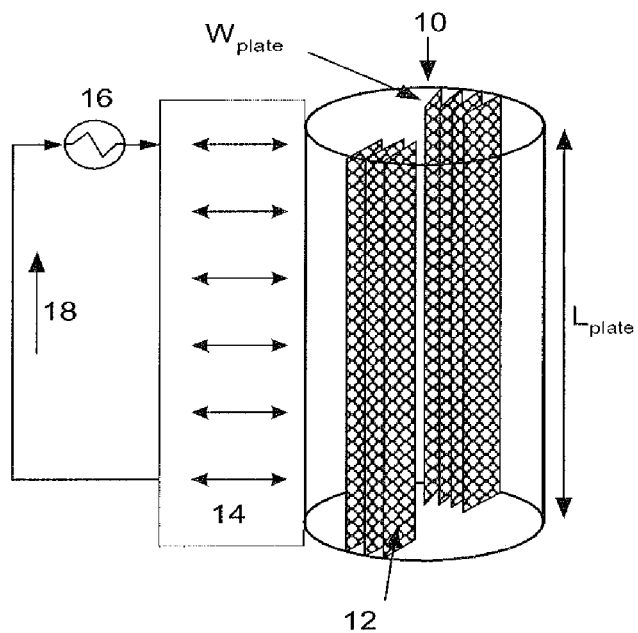
FIG. 2a illustrates an alternative embodiment of the present invention.

Referring now to FIG. 2a, an alternative embodiment in accordance with the present invention is illustrated (adsorbent(s) not shown in FIG. 2a). The number of plates shown in FIG. 2a is seven (three in front and four in the back of the figure) and is intended to be for purposes of illustration and is not to be construed as limiting. In this embodiment, plates can extend over any portion of the entire length of the vessel ($L_{plate} \leq L_{vessel}$) and have a width equivalent to some portion of the internal radius of the vessel ($W_{plate} \leq R_{vessel}$). The number of heat transfer plate(s) 12 in such embodiment is at least one and can vary depending on the process and process media. In one particular and exemplary arrangement shown in FIG. 2a, the $L_{plate}$ is equal to $L_{vessel}$, but the width of each plate ($W_{plate}$) is less than the $R_{vessel}$. The plates can be arranged at various angles relative to the entrance and exit of the vessel 10 corresponding to the cocurrent and/or countercurrent direction of flow of the process media. In preferred embodiments, however, the plates are arranged substantially parallel to the cocurrent and/or countercurrent direction of flow of the process media. As also shown in FIG. 2a, heat transfer to and from vessel 10 is similar to that shown in FIG. 1. Alternatively, heat transfer to and from vessel 10 could be accomplished in accordance with any of the other arrangements discussed herein.

Figure 2B:
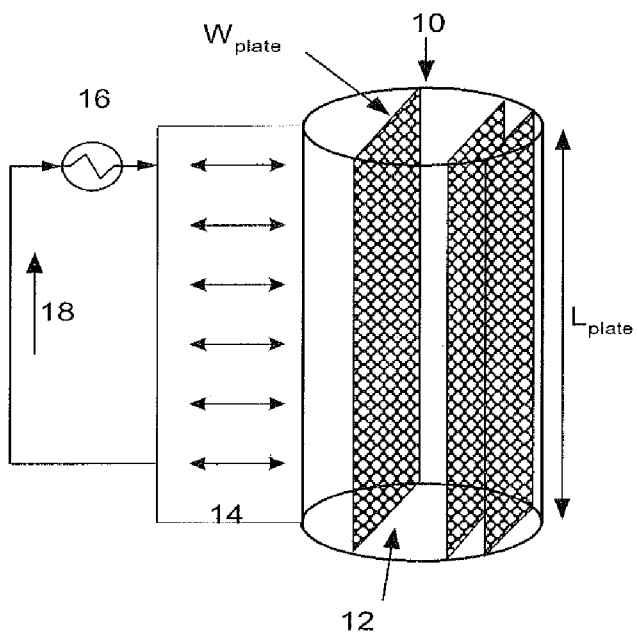
FIG. 2b illustrates another alternative embodiment of the present invention.

FIG. 2b illustrates another embodiment in accordance with the present invention (adsorbent(s) not shown in FIG. 2b). The number of plates shown in FIG. 2b is three and is intended to be for purposes of illustration and is not to be construed as limiting. In this embodiment, plates can extend over any portion of the entire length of the vessel ($L_{plate} \leq L_{vessel}$) and have a width equivalent to less than or equal to the diameter of the vessel, $D_{vessel}$ ($W_{plate} \leq D_{vessel}$). The number of heat transfer plate(s) 12 in such embodiment is at least one and can vary depending on the process and the process media. In one particular and exemplary arrangement shown in FIG. 2b, the $L_{plate}$ is equal to $L_{vessel}$ but the width of each plate ($W_{plate}$) is greater than the internal radius of the $R_{vessel}$. The plates can be arranged at various angle(s) relative to the entrance and exit of the vessel 10 corresponding to the cocurrent and/or countercurrent direction of flow of the process media. In preferred embodiments, however, the plates are arranged substantially parallel to the cocurrent and/or countercurrent direction of flow of the process media. As also shown in FIG. 2b, heat transfer to and from vessel 10 is similar to that shown in FIG. 1. Alternatively, heat transfer to and from vessel 10 could be accomplished in accordance with any of the other arrangements discussed herein.

Figure 3:
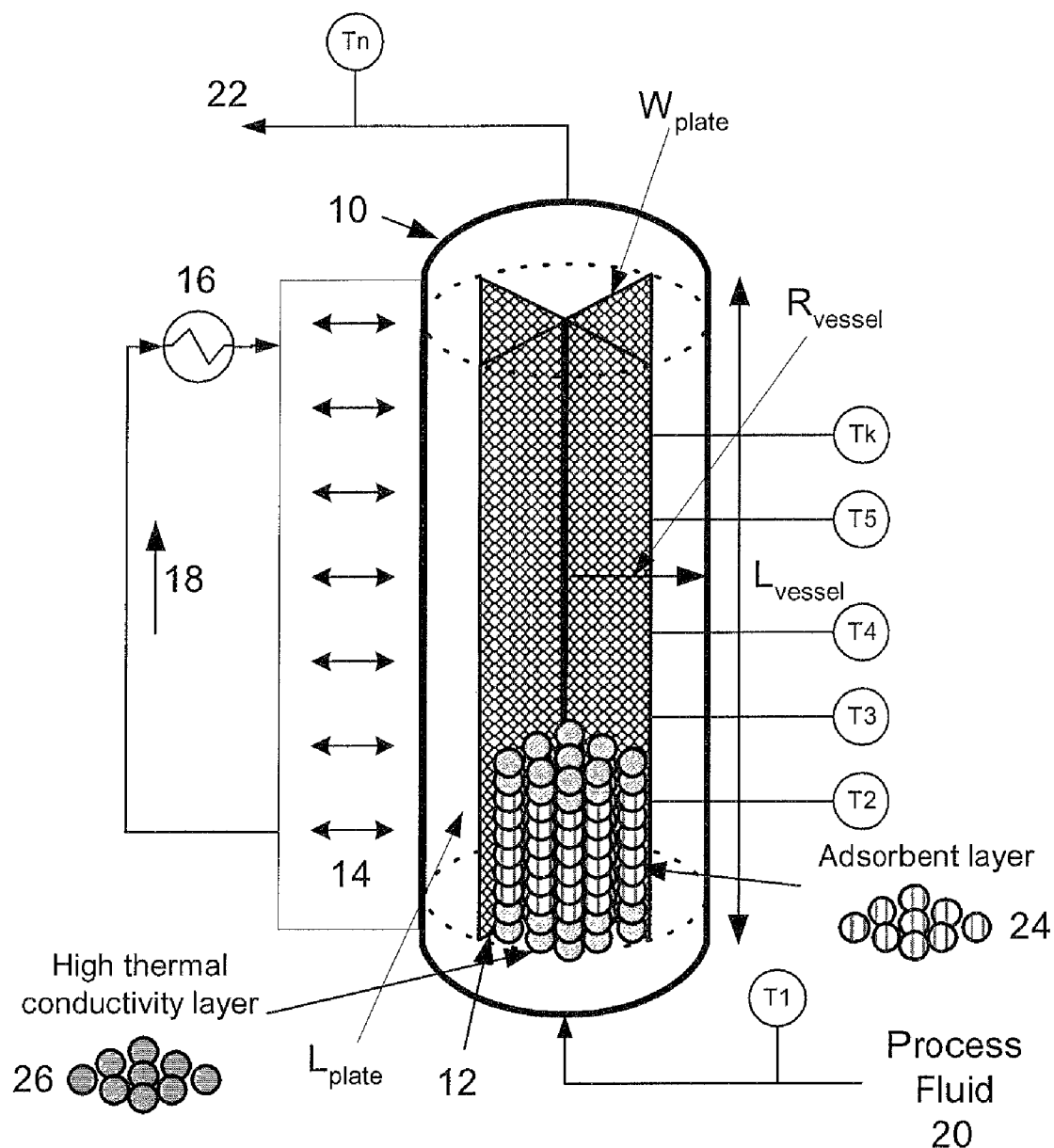
FIG. 3 illustrates yet another embodiment of the present invention.

FIG. 3 illustrates yet another embodiment of the present invention. The embodiment shown in FIG. 3 includes one or more high thermally conductive layer(s) 26 positioned between one or more adsorbent layer(s) 24. Thermally conductive layer(s) 26 may be formed of thermally conductive perforated wheels, one or more layer(s) of thermally conductive beads, and/or combinations thereof. The inclusion of layer(s) 26 can be used to further improve the heat transfer capabilities and controls to and from the vessel and within the vessel. Layer(s) 26 is to be formed of material having higher thermal conductivity (e.g., materials of high thermal conductivity such as aluminum, steel, nickel, copper, tantalum, gold, ceramic or combinations thereof) than the thermal conductivity of the adsorbent(s) and is to be inert with respect to the at least one adsorbent and the process media. The material(s) of construction for layer(s) 26 could be the same or different from the material(s) of construction for the at least one plate. Depending on the process, layer(s) 26 may thus be of higher thermal conductivity than the plate(s) or vice versa. The material(s) of construction for layer(s) 26 could also be the same or different from the material(s) of construction for the vessel. Depending on the process, layer(s) 26 may thus be of higher thermal conductivity than the vessel or vice versa.

Figure 4:
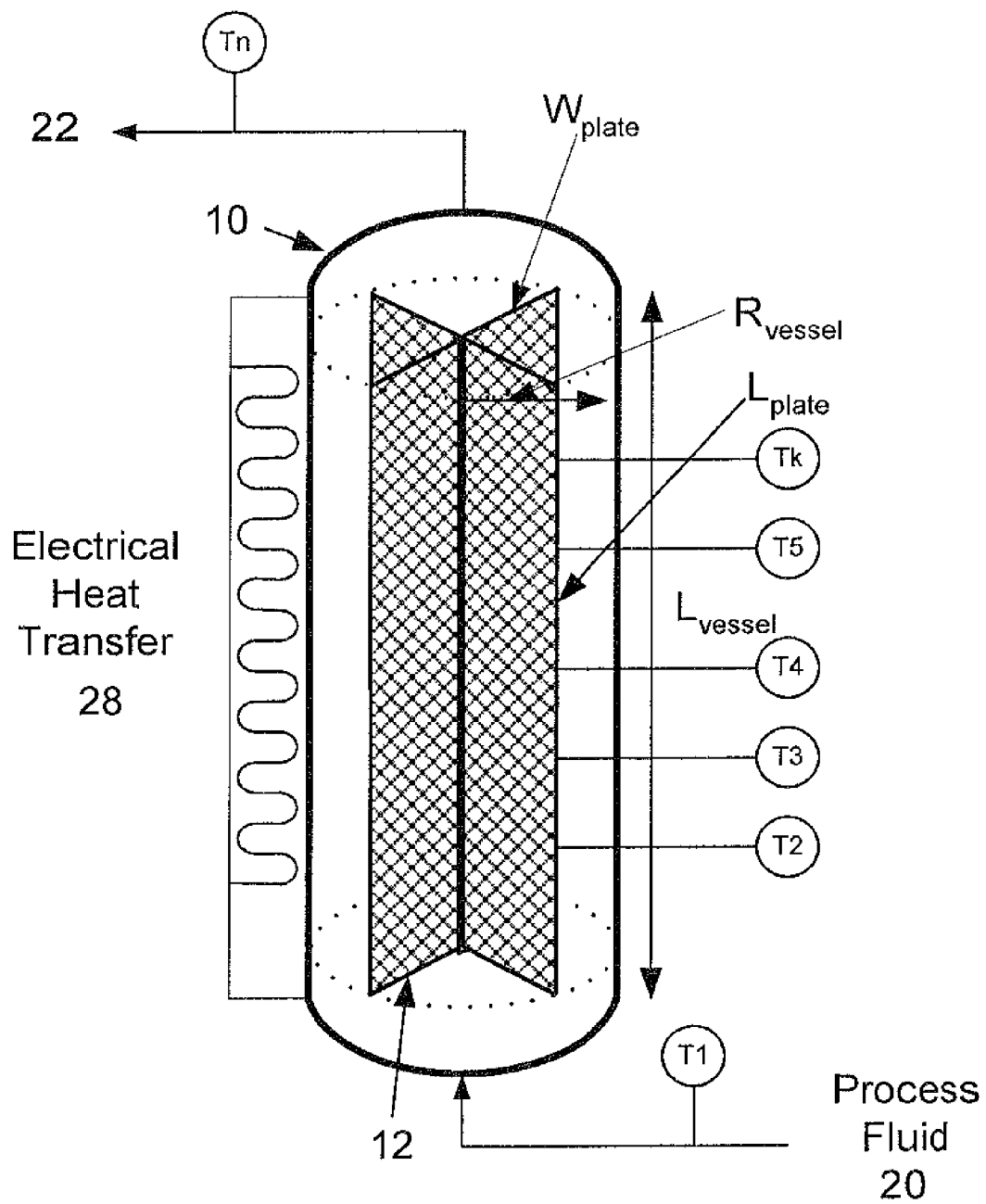
FIG. 4 shows still another embodiment of the present invention.

FIG. 4 shows another embodiment of the present invention in which an electrical heating jacket 28 is utilized to provide heat transfer to and from vessel 10 (adsorbent(s) not shown in FIG. 4). More specifically, electrical heating jacket 28 is in thermal contact with vessel 10 and is configured to provide heat to vessel 10. In some embodiments, electrical heating jacket 28 is also configured to provide cooling (e.g. through the use of a flow through jacket or the like).

In other alternative embodiments in which there is an electrical heat source (such as in FIG. 4) or circulating heat transfer fluid in a jacket (such as in FIG. 1), it is expected that independent temperature control of one or more regions corresponding to one or more designated thermocouples can be accomplished through the use of multiple heat jackets. Each heat jacket could thus have separate inlets and outlets for transferring heat to and from the respective regions in response to feedback from the corresponding thermocouples.

Figure 5:
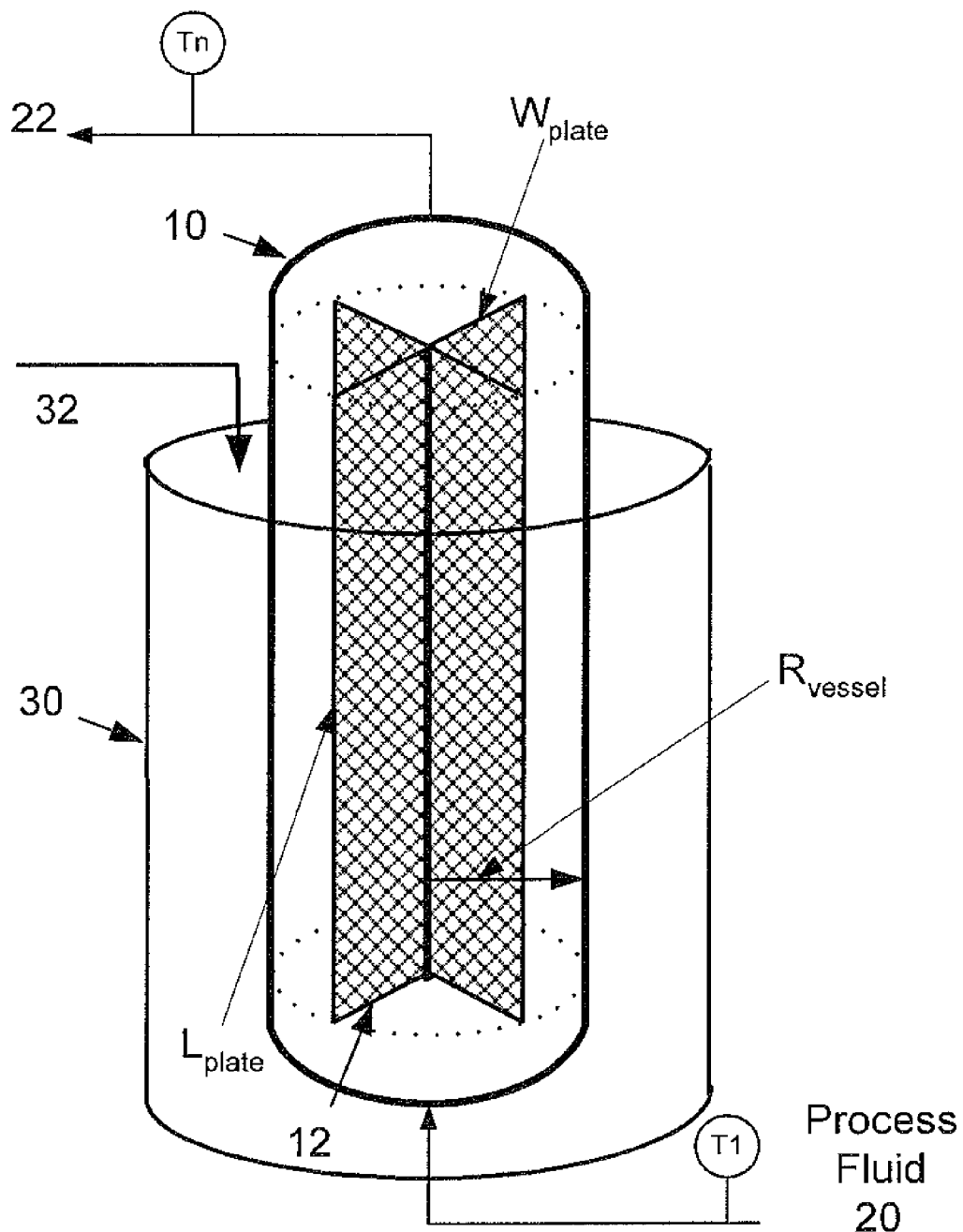
FIG. 5 illustrates yet a further embodiment of the present invention.

In still other alternative arrangements, heat could be transferred to and from adsorbent vessel 10 by immersing or partially immersing vessel 10 in a temperature controlled bath or by supplying heat or cooling using an oven or other suitable heat exchange method. For example and with reference to FIG. 5 (adsorbent(s) not shown in FIG. 5), heat transfer to and from vessel 10 can be accomplished by partially immersing vessel 10 in temperature controlled bath 30. The temperature of the bath 30 can be controlled by controlling the temperature of the bath fluid 32 by appropriate methods. Bath fluid 32 may be any fluid suitable for providing adequate heating and/or cooling to vessel 10. In the embodiment shown in FIG. 5, it will be understood that heating and cooling would not be used simultaneously. Bath fluid 32, however, may be used for both heating and cooling by changing the temperature of the fluid in the bath. Alternatively, the bath fluid 32 may include a fluid for heating during activation and thereafter, the fluid may be changed to a coolant for use during purification. More specifically, vessel 10 could be immersed or partially immersed in a bath 30 containing an appropriate heat transfer fluid. Thereafter, bath 30 could be drained and fluid 32 replaced with another suitable fluid for the intended process. In still other embodiments, vessel 10 could be removed and placed in another bath 30 containing a coolant for the purification process. Exemplary heating fluids and/or coolants may include water, liquid nitrogen, glycol or other suitable heat transfer fluid. These coolants and heating fluids are illustrative and not to be construed as limiting. Other coolants and heating fluids capable of providing the desired cooling or heating capabilities to vessel 10 for a given process may be used in accordance with the present invention. Those skilled in the art will be able to select an appropriate heat transfer fluid(s).

In other aspects of the present invention, it is expected that the activation time (i.e., which can include the time required for the bed to heat up to the desired activation temperature, the time for the activation step (including activation of a new bed of adsorbent or regeneration of a used bed of adsorbent) and the time to cool down to process or ambient temperature) for adsorbent vessels beds used in such processes and systems can be reduced. During activation of the bed and prior to initiating a purification process, dry purge gas can be passed through the vessel and over the at least one adsorbent bed and at least one adsorbent in a direction cocurrent or countercurrent to the flow of gas to be purified such that adsorbed species on the adsorbent(s) can be removed. In preferred embodiments, the flow of the purge gas is in a direction countercurrent to the direction of flow of the gas to be purified and purge gas containing desorbed compounds exits the end of the bed opposite the feed end of the purge gas.

Various purge gases can be used in accordance with the present invention so long as the purge gas is inert with respect to the adsorbent(s) in the bed and the fluid to be purified. For example and while not to be construed as limiting, nitrogen, hydrogen, helium, or argon can be used as purge gas, alone or in sequence with one another. In accordance with the present invention, it is expected that the time required for activation prior to use in the purification process or in a regeneration mode of the adsorbent(s) when the adsorbent(s) is to be reused can be reduced due to the improved heat transfer controls provided herein.

For purposes of illustration and while not intending to be bound by a specific method of activation, an exemplary activation process could include the following. Following loading of the adsorbent in a vessel having the desired heat transfer internals of the present invention therein, an activation step to remove moisture (and/or other impurities) can be provided by using one or more inert purge gases such as nitrogen. More specifically, nitrogen can be introduced into the vessel and passed through the vessel in a countercurrent mode to raise the temperature within the vessel to a predetermined temperature (e.g., 300° C.). The temperature within the vessel is maintained for a period of time (e.g., about 60 hours). The heat transfer source to the vessel can then be turned off and the vessel allowed to cool. In some embodiments, nitrogen may be used and passed through the vessel during all three steps of activation (heating the vessel, maintaining the temperature of the vessel and cooling the vessel). The nitrogen and any desorbed components can be removed at the inlet 20 of vessel 10. For some processes, it may be desirable to change the activation fluid (e.g., purge gas such as nitrogen) to a second activation fluid (e.g., purge gas such as helium) for use during a part of the activation step and cooling step. Similar steps can be used for regeneration of the at least one adsorbent when it is desirable or preferable to do so. The heat transfer arrangements of the present invention can be used to reduce the time required for any or all of the three steps of such activation.

Referring again to FIG. 1, in a preferred embodiment of the invention, dry purge gas could flow down through adsorbent vessel 10 during activation of the bed(s) and purge gas containing desorbed compounds would leave through the inlet to the vessel. Addition of heat to the bed could occur through use of a heating jacket or other heat transfer sources discussed hereinabove. Thermocouples $T_1$ to $T_n$ located in the vessel and in the purge gas piping could be used to control addition or removal of heat via the heating jacket. During activation of the bed, the temperature of the bed and adsorbent(s) are raised to a temperature of between about 100-400° C. (e.g., 350° C. to remove moisture). Such temperature range can vary, however, depending on the adsorbent(s) used and the fluid being purified.

During purification, the process fluid 20 preferably enters vessel 10 at the opposite end from the purge gas and the purified product exits vessel 10 as product 22. Feed temperature of gas entering the vessel can be controlled using a heat exchanger or the like on the feed line. Feed gas to be purified is then passed through vessel 10 and over the at least one adsorption bed formed of the at least one adsorbent under predetermined conditions during a purification step. During the purification step, heating and/or cooling can be provided to the adsorption bed to maintain and/or reduce the temperature within the bed to an operating temperature range (e.g., within +/−10° C. of 20° C.) within an acceptable purification temperature range (e.g., −150° C. to 150° C.). During the purification step, the temperature within the bed and the temperature of the gas being processed are monitored and heat transfer to and from the bed based on temperature are regulated to maintain the bed within the desired temperature range. The vessel can be heated and/or cooled through flow of a heat transfer fluid (e.g., heating fluid and/or coolant 18) through a jacket, by immersing or partially immersing the bed in a coolant or through any of the methods described hereinabove.

Following purification, the process may include a decontamination step in which nitrogen or another inert gas is fed through the vessel to remove or desorb process fluid such as arsine or phosphine which has been adsorbed on the adsorbent(s). Given the toxicity of some process fluids, such decontamination steps are sometimes included prior to disposal of the adsorbent even when the adsorbent(s) is not to be reused. The present invention can be used during such decontamination step to better control the heat transfer to and from the vessel and the temperature within the vessel during decontamination.

The present invention allows for further flexibility in selecting desirable heat transfer systems by providing vessels that can be activated in situ or in locations other than the purification site. For example, vessels in accordance with the present invention can be manufactured and the appropriate internals (including plate(s), thermocouples and the like) positioned in the vessel. Adsorbent(s) can then be loaded into the vessel. The bed(s) in the loaded vessel can be activated using one of the heat transfer arrangements discussed above. Thereafter, the vessel can be moved to another location or remain in the same location and the same or a different heat transfer arrangement can be used for the purification process. This increases the ability to select various heat transfer options and heat transfer fluids for a given process.

As discussed hereinabove, the present invention allows gases such as semiconductor process gases (e.g., arsine, phosphine and ammonia) to be purified. The present invention, however, can also be used with other gases to be purified. The present invention could be used with other adsorption processes than purification of semiconductor gases. For example and while not to be construed as limiting, the present invention could be used in adsorption applications such as pressure swing adsorption (PSA) processes, vacuum pressure swing adsorption (VPSA) processes, temperature swing adsorption (TSA) processes and combinations thereof. In addition, the present invention is expected to be suitable for use in the adsorption aspects of U.S. Pat. No. 6,576,138 B2. The present invention is expected to be applicable to fluids to be purified. It is understood that such fluids can be in a liquid or gaseous state.

The present invention thus provides for direct or indirect heating and/or cooling. This is expected to improve the dynamic adsorption efficiency of the adsorption bed, thus requiring potentially fewer beds to be used and/or producing a higher purity product from the same number of beds. Additionally, by operating the bed within a narrow temperature range (i.e. a less conservative mode of operation), it may be possible to extend the useful life of the bed(s) beyond current levels. While the relative cost of the temperature control system may not be lower than for multiple beds in series, the potential to change-out fewer beds than practiced today is significant because of the often highly toxic nature of the materials being purified and the need to minimize handling and disposal of these materials.

It should be appreciated by those skilled in the art that the specific embodiments disclosed above may be readily utilized as a basis for modifying or designing other structures or methods for carrying out the same purposes of the present invention. It should also be realized by those skilled in the art that such equivalent constructions do not depart from the spirit and scope of the invention as set forth in the appended claims.

What is claimed is:

1. A process for activating at least one adsorption bed in an adsorption vessel, the activation process comprising:
feeding an activation fluid into an adsorption vessel, the adsorbent vessel having an inner surface and an outer surface, the vessel comprising at least one adsorbent bed formed of at least one adsorbent; at least one plate in thermal contact with the inner surface of the vessel and formed of material having higher thermal conductivity than the thermal conductivity of the at least one adsorbent; and wherein the at least one plate is configured to transfer heat and/or cooling to and from the at least one adsorbent bed;

passing the activation fluid over the at least one adsorption bed in the adsorption vessel for a time sufficient for the at least one adsorption bed to heat up to an activation temperature;

maintaining the flow of the activation fluid through the at least one adsorption bed during an activation step, the activation step being for a time sufficient to activate the at least one adsorbent or for a time sufficient to regenerate the at least one adsorbent; and cooling the at least one adsorption bed during a cooling step, the cooling step being for a time sufficient for the at least one adsorption bed to reach a predetermined cooled temperature;

wherein the activation fluid is removed from the adsorption vessel and replaced with a second activation fluid prior to the cooling step.

2. The activation process of claim 1, wherein the activation fluid is replaced with the second activation fluid during the activation step.

3. The activation process of claim 2, wherein the activation fluid and the second activation fluid are inert gases.

4. The activation process of claim 3, wherein the inert gases are selected from the group consisting of: nitrogen, hydrogen, helium, and argon.

\* \* \* \* \*